April 4, 1950  O. A. PAUTZ  2,503,129
VEHICLE UNLOADER
Filed Feb. 24, 1948  3 Sheets-Sheet 2
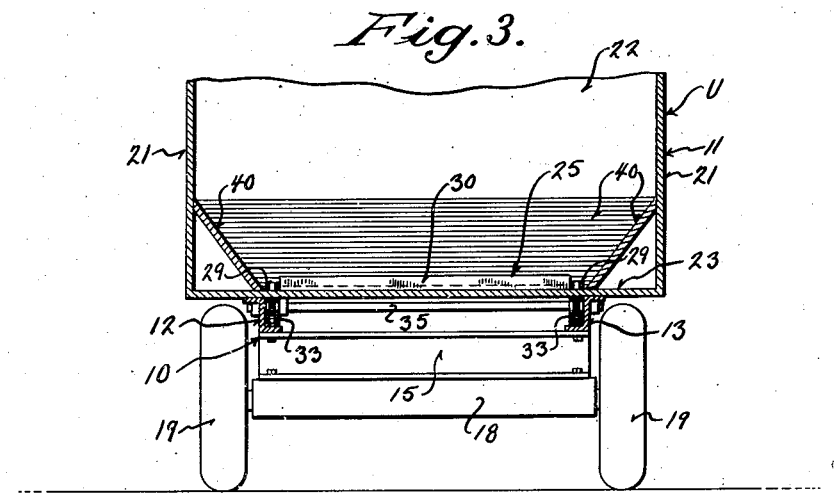
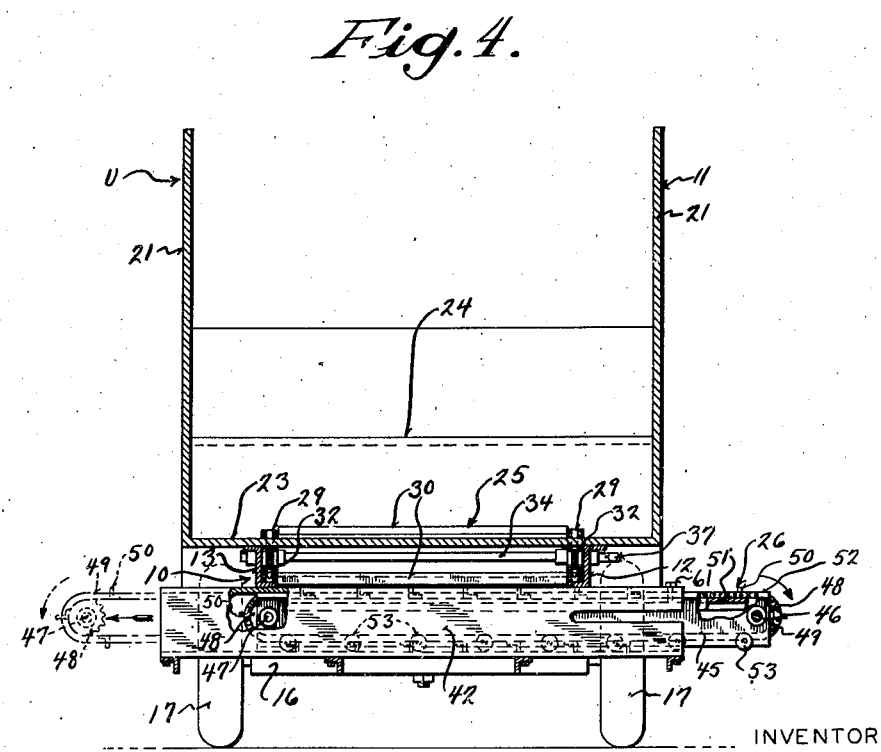
INVENTOR
ORMIE A. PAUTZ
ATTORNEYS

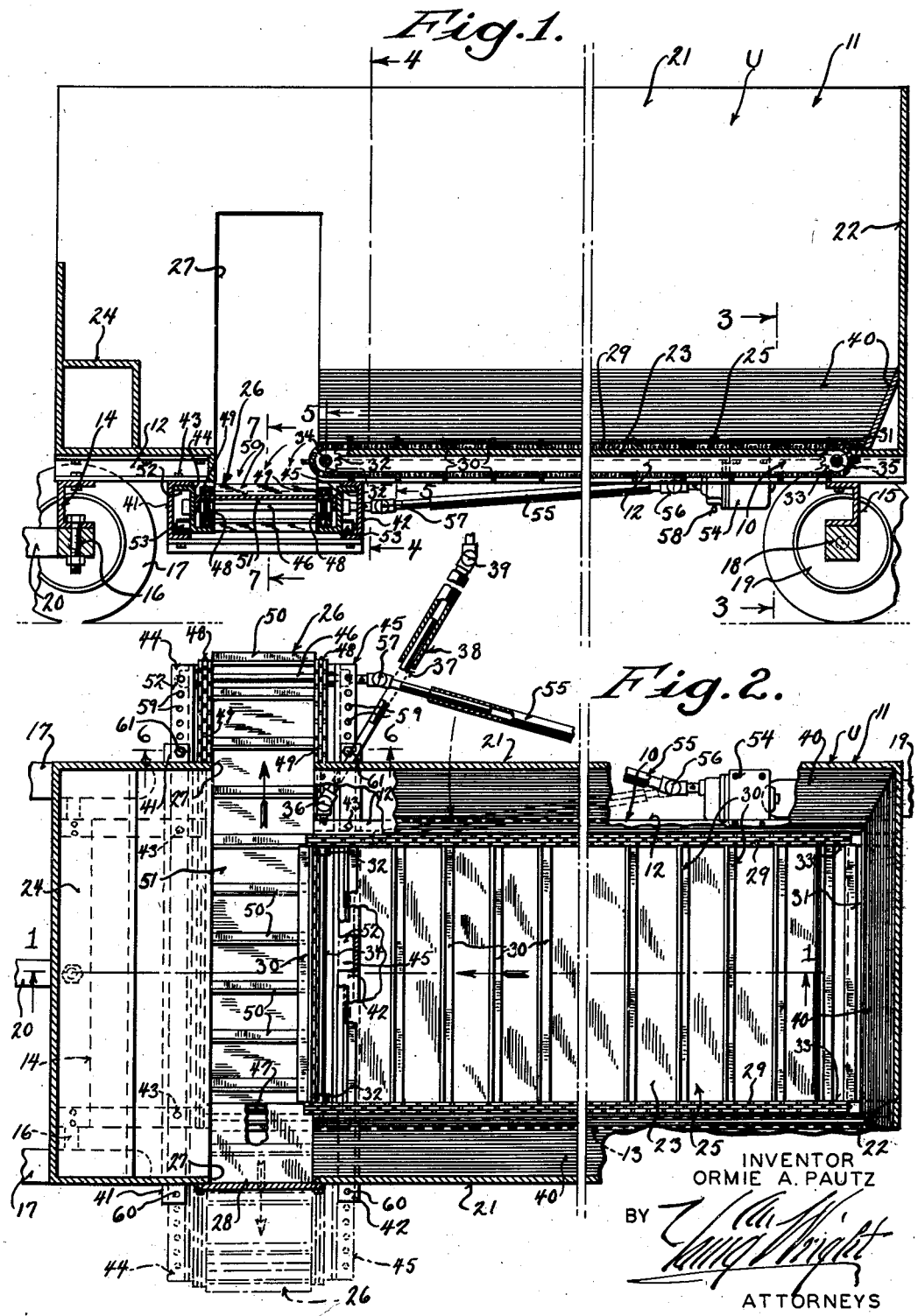

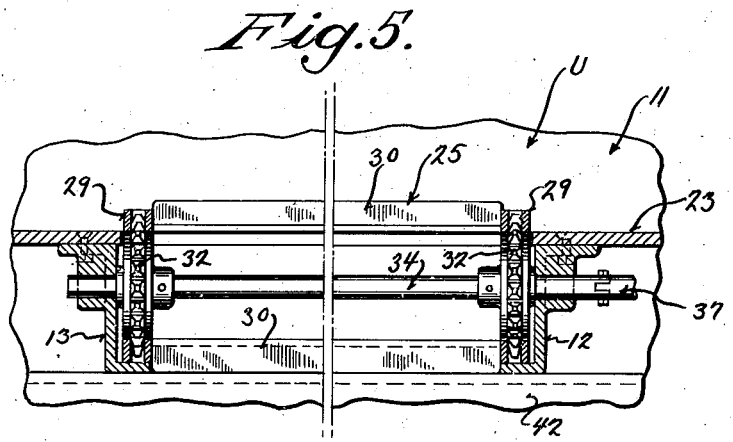
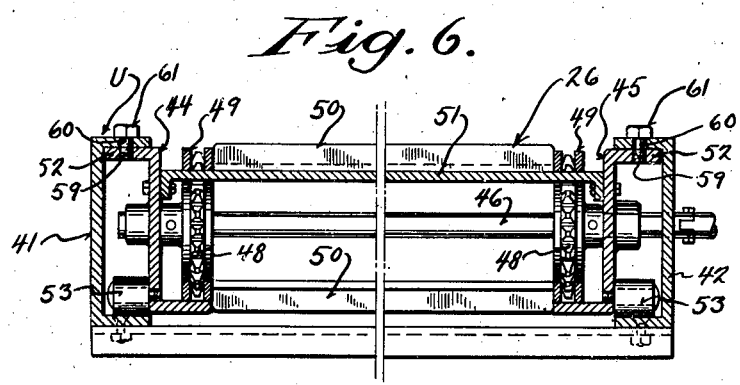
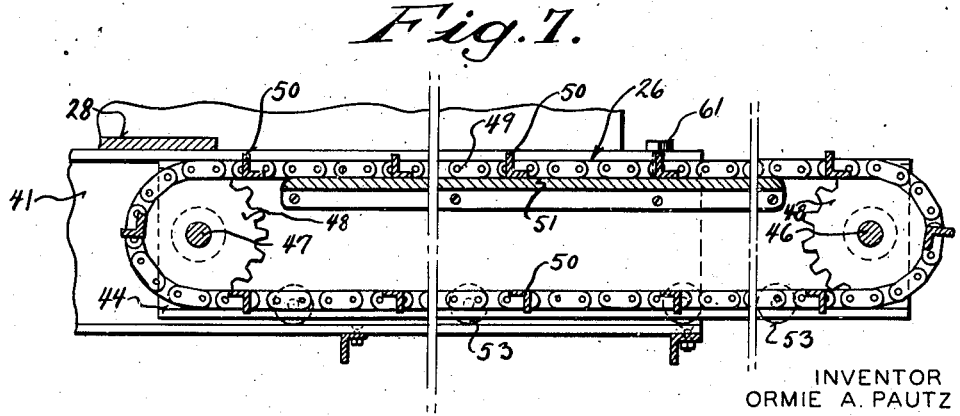

Patented Apr. 4, 1950

2,503,129

UNITED STATES PATENT OFFICE 2,503,129

VEHICLE UNLOADER

Ormie A. Pautz, Maribel, Wis.

Application February 24, 1948, Serial No. 10,519

1 Claim. (Cl. 214—83.16)

This invention appertains to unloaders and more particularly a novel unloading vehicle unit for farms.

One of the primary objects of my invention is to provide a self-unloading vehicle unit capable of being pulled by a tractor or the like from a field to a convenient unloading position adjacent to a bin, silo or other storage building.

Another salient object of my invention is to provide a self-unloading rack or the like embodying a body for receiving the material to be carried having a longitudinally extending conveyor in the bottom thereof for gradually carrying the material to the front of the vehicle, and a transversely extending conveyor at the extreme front of the vehicle for receiving the material from the longitudinal conveyor and for carrying the material out of the vehicle to the desired place of unloading.

A further object of my invention is to provide a unit, which is unloaded from the front thereof so as to permit the convenient placing of the vehicle in close proximity to the desired unloading point.

A still further object of my invention is to provide an unloader embodying a transversely extending unloading conveyor with means for shifting this conveyor out of either side of the vehicle, so that the vehicle can be unloaded from either side.

Another further object of my invention is the provision of novel means for slidably mounting the transversely extending conveyor on the vehicle and for locking this conveyor in a selected adjusted position.

With these and other objects in view, the invention consists in the novel construction, arrangement and formation of parts, as will be hereinafter more specifically described and claimed, and illustrated in the accompanying drawings, in which drawings:

Figure 1 is a longitudinal, sectional view through the novel unloading unit, the section being taken substantially on the line 1—1 of Figure 2 looking in the direction of the arrows.

Figure 2 is a horizontal, sectional view through the unloading unit looking down on the conveyors and showing the transversely extending conveyor in full lines in one of its selected adjusted positions.

Figure 3 is a transverse sectional view through the vehicle taken on the line 3—3 of Figure 1, looking in the direction of the arrows.

Figure 4 is a similar sectional view taken on the line 4—4 of Figure 1, looking in the direction of the arrows.

Figure 5 is an enlarged, fragmentary, detail, transverse, sectional view taken on the line 5—5 of Figure 1, looking in the direction of the arrows.

Figure 6 is an enlarged, fragmentary, detail, sectional view taken on the line 6—6 of Figure 2, looking in the direction of the arrows illustrating the mounting of the transverse conveyor.

Figure 7 is a longitudinal, sectional view through the transverse conveyor taken substantially on the line 7—7 of Figure 1, looking in the direction of the arrows.

Referring to the drawings in detail wherein similar reference characters designate corresponding parts throughout the several views, the letter U generally indicates my novel unloading unit, and the same includes a wheeled undercarriage or chassis 10 on which is mounted a body 11 for receiving the load. The exact construction of the undercarriage or chassis 10 and the body 11 can be changed to suit varying conditions.

As illustrated, the chassis 10 includes the spaced parallel longitudinally extending side beams or sills 12 and 13. These side beams 12 and 13 can be secured together and braced in any preferred manner. At the front of the frame is secured a transversely extending front bolster 14 and a similar rear bolster 15 is secured to the side beams 12 and 13 adjacent to their rear ends. The front bolster 14 has connected thereto the front axle 16 for the front wheels 17. The bolster 15 has secured thereto a rear axle 18 for the rear wheels 19. The front axle 16 carries any preferred type of draft means 20, so that the unloading unit U can be drawn to and from a field by a tractor or the like.

The body 11 is preferably built high so as to carry a large quantity of the material being transported, and the unit can be completely enclosed should should such be desired. As shown, the body 11 includes side walls 21, a rear wall 22 and a floor 23. A seat 24 can be mounted in the front of the body as shown and for a purpose which will be later set forth.

In accordance with my invention, I mount within the body 11 a longitudinally extending endless conveyor 25 and the upper run of this conveyor travels over the floor 23. Adjacent to the front of the unit, but in rear of the seat 24 is the transversely extending unloading conveyor 26. This conveyor is disposed in front of the longitudinally extending conveyor 25 and slightly below the same for receiving material from said longitudinally extending conveyor. The vehicle body at its sides and in alignment with the transversely extending conveyor is provided with door openings 27 through which the transversely extending conveyor 26 can be shifted. A removable door 28 is provided for closing the door opening 27, which is not in use.

The floor 23 is cut away for the reception of the transverse conveyor 26, and this conveyor is mounted in a novel manner, as will be later described.

The endless longitudinal conveyor 25 can be constructed in various manners, and as illustrated, the same includes endless side sprocket chains 29 connected together by transversely extending flights 30. The flights of the upper run of this conveyor travel over the floor 23 toward the transverse conveyor 26. The floor adjacent to the rear of the vehicle, provided with a slot 31 for the longitudinal conveyor. The sprocket chains 29 of the longitudinal conveyor are trained over front and rear pairs of sprocket wheels 32 and 33, and these sprocket wheels are in turn respectively secured to transversely extending shafts 34 and 35. The shafts 34 and 35 are rotatably mounted in suitable bearings carried by the side beams 12 and 13 of the chassis or frame of the unit. The front shaft 34 is extended beyond its conveyor and has connected thereto by a universal joint 36 a drive shaft 37. The drive shaft 37 preferably consists of a telescoping section 38 and a second universal joint 39. The shaft 37 is adapted to be driven from a stationary motor (not shown) placed at an advantageous position at the point of unloading. This is desirable in view of the fact that the longitudinal conveyor 25 carries a relatively heavy load. Most farms are now provided with electric power, and the motor employed for operating the drive shaft 37 can be an electric motor.

The side walls 21 of the body 11 and the end walls 22 of the body at their lower ends are provided with inwardly directed guide boards 40, so that the load will be directed toward the longitudinal conveyor.

As heretofore brought out, the transverse conveyor 26 and the mounting thereof forms an important part of this invention. In order to support the transverse conveyor 26, I provide transversely extending spaced parallel channel beams 41 and 42. While these beams extend transversely of the unit, they extend longitudinally of the transverse conveyor. These channel beams 41 and 42 are rigidly secured in place such as by means of bolts 43 to the side beams 12 and 13 of the vehicle frame. In effect, these channel beams 41 and 42 form tracks for supporting the transverse conveyor.

The transverse conveyor 26, itself, includes side frame beams 44 and 45, and these beams rotatably carry the end shafts 46 and 47 for the conveyor, and these shafts have secured thereto end sprocket wheels 48 over which travel the side sprocket chains 49 of the conveyor. Flights 50 are connected to the sprocket chains at equidistantly spaced points, and the upper run of this transverse conveyor travels over a plate or table 51 rigidly secured to the frame beams 44 and 45 of the transverse conveyor. The beams 44 and 45 are provided at their upper edges with out-turned guide flanges 52, and these guide flanges are received within the channel beams 41 and 42 and engage the inner faces of the upper flanges of the channel beams 41 and 42. The frame beams 44 and 45 of the transverse conveyor at their sides and adjacent to their lower ends carry outwardly projecting rollers 53 which travel over the bottom flanges of the channel beams 41 and 42.

By the arrangement of the mounting of the transverse conveyor 26, the same can be readily and easily shifted from one side of the vehicle to the other according to whether the load is going to be unloaded from one side of the vehicle or the other. The side of the vehicle from which the transverse conveyor is shifted outwardly is left open, and the door 28 is utilized to close the other side of the vehicle.

An electric motor 54 can be mounted directly on the side frame beam 12 of the vehicle, and this motor can be of the reversible type. Operatively connected to the motor 54 is a telescoping drive shaft 55, and the ends of this shaft are operatively connected by universal joints 56 and 57 respectively with the motor 54 and the transverse conveyor shaft 46. Hence, by this arrangement the conveyor can be shifted from side to side and still maintain its driving connection with the motor 54. A reversing switch 58 is connected to the motor so that the transverse conveyor can be driven in the desired direction. The current for the motor 54 can be derived from the farm circuit, and when the vehicle is at rest and at its unloading position, the motor 54 is plugged into this circuit.

In actual practice an operator can sit upon the seat 24, and the switches for the motor for the longitudinal conveyor 25 can be located near the operator, so that the feeding of this belt 25 can be controlled.

After the vehicle or unit U has been drawn alongside of the desired unloading point, the transverse conveyor 26 is slid in the channel ways 41 and 42 to the desired position and is then locked in the selected position against further sliding movement. Any desired means can be provided for locking the conveyor 26 in the selected position. As illustrated, the out extending flanges 52 of the conveyor frame beams 44 and 45 are provided with spaced openings 59 at each end. The ends of the channel beams 41 and 42 are provided with openings 60 and bolts 61 can be placed in registering openings 59 and 60.

By having the transverse conveyor at the front of the vehicle and the operator's seat in the front of the vehicle, the vehicle can be conveniently manipulated so as to accurately position the transverse conveyor 26 at the desired unloading place. As brought out above, the unloading of the vehicle can be conveniently controlled by a single operator.

Changes in details may be made without departing from the spirit or the scope of this invention, but what I claim as new is:

A vehicle unloader unit comprising a wheeled frame including spaced side beams, a body for the load secured to said beams, a longitudinally extending conveyor mounted in the bottom of the body for conveying the load toward one end of the body, means for driving said longitudinal conveyor including a telescoping drive shaft and universal joints, a transverse conveyor arranged in front of and below the longitudinal conveyor for receiving the load therefrom and including side frame beams, spaced parallel guide channel tracks rigidly secured to the frame beams of the vehicle, means for driving the transverse conveyor, including a telescoping shaft, and means slidably mounting the frame beams of the transverse conveyor in said channel guide tracks.

ORMIE A. PAUTZ.

REFERENCES CITED

The following references are of record in the file of this patent:

UNITED STATES PATENTS

| Number | Name | Date |
|---|---|---|
| 1,928,859 | Kutscha | Oct. 3, 1933 |
| 2,321,168 | Tognetti | June 8, 1943 |
| 2,340,983 | Pfeiffer et al. | Feb. 8, 1944 |
| 2,419,824 | Davis | Apr. 29, 1947 |